United States Patent [19]

Azusawa et al.

[11] Patent Number: 4,628,475
[45] Date of Patent: Dec. 9, 1986

[54] PULSE WIDTH MODULATION PULSE GENERATOR

[75] Inventors: Noboru Azusawa; Hisayoshi Shiraishi, both of Katsuta, Japan

[73] Assignee: Hitachi, Ltd., Tokyo, Japan

[21] Appl. No.: 576,720

[22] Filed: Feb. 3, 1984

[30] Foreign Application Priority Data

Feb. 4, 1983 [JP] Japan .................. 58-16039

[51] Int. Cl.⁴ .................. G06G 7/16; H02P 13/18; H02P 8/00; H02M 7/48
[52] U.S. Cl. .................. 364/851; 363/41; 363/42; 318/802; 318/811; 307/265
[58] Field of Search .................. 364/851; 363/41, 42; 318/802, 811; 307/265; 375/22

[56] References Cited

U.S. PATENT DOCUMENTS

| | | | |
|---|---|---|---|
| 3,824,437 | 7/1974 | Blaschke | 318/803 |
| 4,047,083 | 9/1977 | Plunkett | 363/41 X |
| 4,099,109 | 7/1978 | Abbondanti | 307/265 X |
| 4,140,980 | 2/1979 | Cummings | 375/22 X |
| 4,189,669 | 2/1980 | Van Loon et al. | 318/811 |
| 4,223,282 | 9/1980 | DeBoer | 375/22 X |
| 4,367,520 | 1/1980 | Muto et al. | 363/41 |
| 4,382,275 | 5/1983 | Glennon | 363/41 |
| 4,480,299 | 10/1984 | Muto et al. | 318/802 X |
| 4,490,666 | 12/1984 | Tanamachi et al. | 318/802 X |
| 4,524,335 | 6/1985 | Yokoyama | 375/22 X |

OTHER PUBLICATIONS

Franke, T. W. "PWM Signal Demodulator with Frequency Drift Compensation" IBM Technical Disclosure Bulletin 12-66.
Frushour and Siderewicz, "Voltage Programmable Delay-Pulse Width Circuit" IBM Technical Disclosure Bulletin 12/66.

Primary Examiner—Jerry Smith
Assistant Examiner—Charles B. Meyer
Attorney, Agent, or Firm—Antonelli, Terry & Wands

[57] ABSTRACT

A modulating wave signal whose phase abruptly changes is compared with a carrier signal to generate a pulse width modulation pulse. The carrier signal is a sine wave signal having a frequency n times as high as that of the modulating signal and synchronized with the modulating signal. A phase of the carrier abruptly changes by a factor of n as the phase of the modulating signal abruptly changes. Thus, a pulse with modulation pulse which causes an output voltage of a pulse with modulation inverter to be sinusoidal is generated even if the phase of the modulating wave signal abruptly changes.

4 Claims, 8 Drawing Figures

PRIMARY ANGULAR
FREQUENCY COMMAND

PULSE WIDTH MODULATION PULSE GENERATOR

BACKGROUND OF THE INVENTION

The present invention relates to a PWM (pulse width modulation) pulse generator for generating a PWM pulse used to control a PWM inverter.

The PWM inverter is widely used to control the speed of an induction motor. The firing of the PWM inverter is controlled by the PWM pulse produced by comparing a sine wave voltage signal (modulating wave) with a triangular signal (carrier). The amplitude and frequency of the sine wave voltage signal are determined such that a fundamental wave component of an output voltage of the PWM inverter corresponds to the amplitude and frequency required by the induction motor.

Recently, a vector control method has been proposed and put into practice in which a primary current of the induction motor is reduced to a component in the same direction to a magnetic flux axis (exciting current component) and a component orthogonal thereto (torque current component) and these components are individually controlled. By employing the vector control method, a high precision torque control of the induction motor is attained as is done in a DC motor. The vector control method is disclosed in U.S. Pat. No. 3,824,437 (corresponding to West German Patent Laid-Open (DOS) No. 1,941,312) and Japanese Patent Application Laid-Open No. 11125/76.

In the vector control method, the amplitude and the frequency of the primary current as well as the phase thereof are momentarily changed. When the vector control method is employed to drive the induction motor by the PWM inverter, the amplitude, the frequency and the phase of the modulating wave are changed. On the other hand, the carrier is controlled such that it is synchronized with each period of the modulating wave. Accordingly, even if the phase of the modulating wave is changed, the carrier is not changed until the end of the period. Thus, the PWM pulse has a waveform which causes the output voltage (fundamental wave component) of the PWM inverter to be non-sinusoidal. As a result, a high precision vector control is not attained.

The vector control may be effected by a digital control by using a microprocessor. However, when the carrier is triangular wave, it has an inflection point which results in discontinuity. Accordingly, a software processing is hard to attain.

SUMMARY OF THE INVENTION

It is an object of the present invention to provide a PWM pulse generator for generating a PWM pulse which causes an output voltage of a PWM inverter to be sinusoidal even if the phase of a modulating wave suddenly changes.

In accordance with the present invention, based on the finding that a sine wave can be linearly approximated within a range of ±86% of amplitude and is essentially equal to a triangular wave having as approximately 1.2 times as high amplitude as that of the sine wave, a sine wave signal is used as a carrier.

The other objects and features of the present invention will be apparent from the following description of the invention.

DESCRIPTION OF THE PREFERRED EMBODIMENTS

Figure 1:
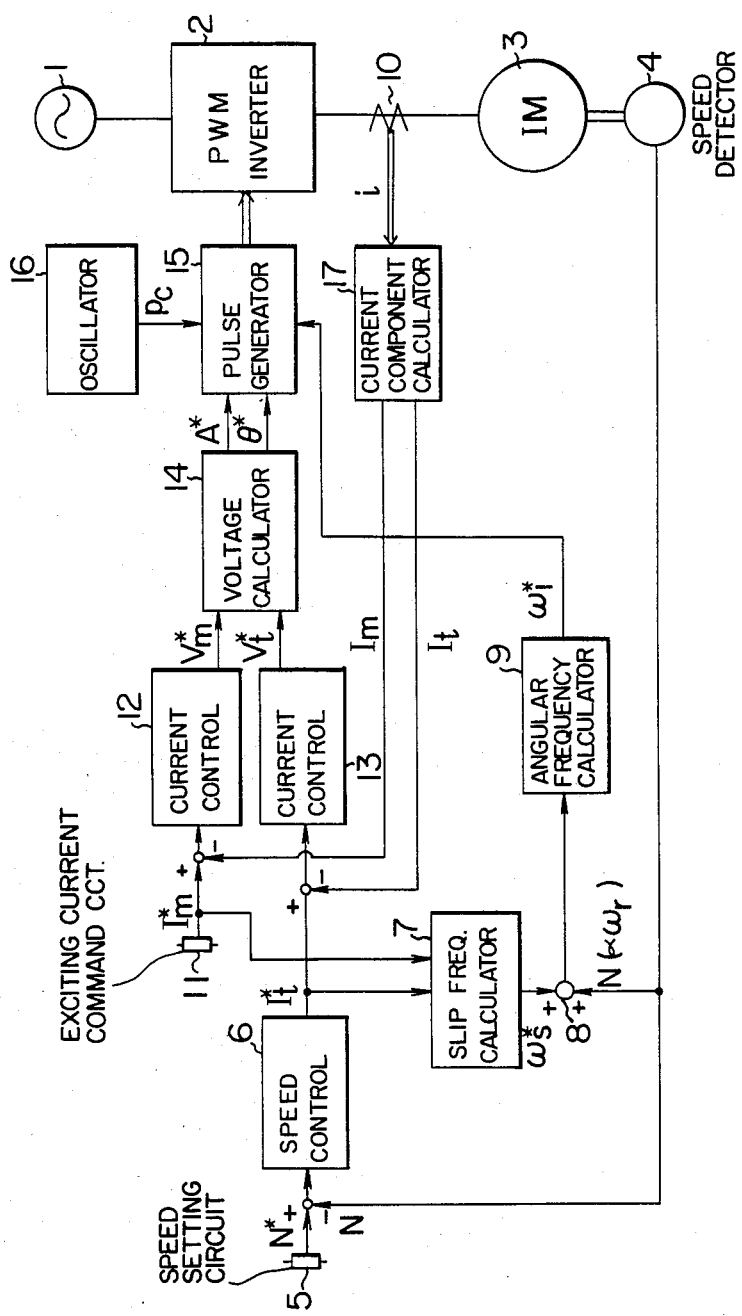
FIG. 1 shows a configuration of one embodiment of the present invention.
Figure 4:
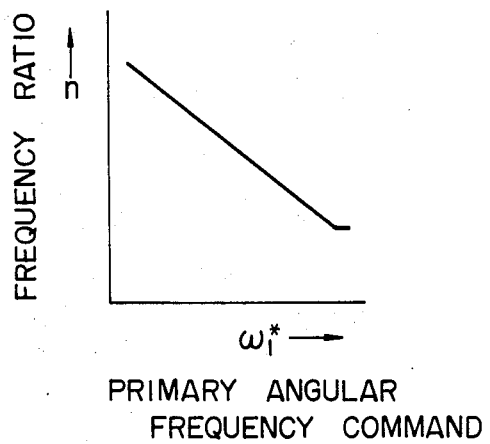
FIG. 4 shows a characteristic of a frequency ratio setting circuit.

FIG. 1 shows one embodiment of the present invention. In FIG. 1, an induction motor 3 is driven by a PWM inverter 2. The PWM inverter 2 includes a rectifier which rectifies an AC voltage supplied from an AC power supply 1 to a DC voltage. An output current from the PWM inverter 2 is detected by a current detector 10. A speed detector 4 is mechanically and directly connected to the induction motor 3. A speed command signal N* of a speed setting circuit 5 and a speed detection signal N of the speed detector 4 are supplied to a speed control circuit 6 with polarities shown in FIG. 1. The speed control circuit 6 produces a torque current command signal $I_t^*$ which is orthogonal to a magnetic flux axis of the induction motor 3, in accordance with a speed error and supplies it to a slip frequency calculator 7 and a second current control circuit 13. The slip frequency calculator 7 calculates a slip frequency command signal $\omega_s^*$ based on the torque current command signal $I_t^*$ and an exciting current command signal $I_m^*$ supplied from an exciting current command circuit 11 and supplies it to an adder 8. The adder 8 sums the slip frequency command $\omega_s$ and a detected speed N (which is proportional to a rotation frequency $\omega_r$), and a sum output thereof is a primary frequency command signal to the induction motor 3. An angular frequency calculator 9 receives the primary frequency command signal from the adder 8 to calculate a primary angular frequency command signal $\omega_1^*$ and supplies it to a pulse generator 15 a current component calculator 17 receives a primary current signal i detected by the current detector 10 to calculate an exciting current $I_m$ which is a current component in the same direction as the magnetic flux axis and a torque current which is an orthogonal current component, as DC currents. The current component calculator may be of the type shown in FIG. 4 of Japanese Patent Application Laid-Open No. 199489/82. A first current control circuit 12 responds to a difference between the exciting current command $I_m^*$ and an actual current $I_m$ to produce an output voltage command $V_m^*$ in the same direction as the magnetic flux axis of the primary phase voltage of the induction motor 3. The second current control circuit 13 responds to a difference between the torque current command $I_t^*$ and an actual current $I_t$ to produce an output voltage command $V_t^*$ which is orthogonal to the magnetic flux axis of the primary phase voltage. Those voltage commands $V_m^*$ and $V_t^*$ are supplied to a voltage calculator 14. The voltage calculator 14 calculates an amplitude command signal A* and a phase command signal $\theta^*$ of a primary voltage (modulating wave) based on the signals $V_m^*$ and $V_t^*$ and supplies a DC signal representing them to the pulse generator 15. A clock pulse Pc from an oscillator 16 is also supplied to the pulse generator 15.

Figure 2:
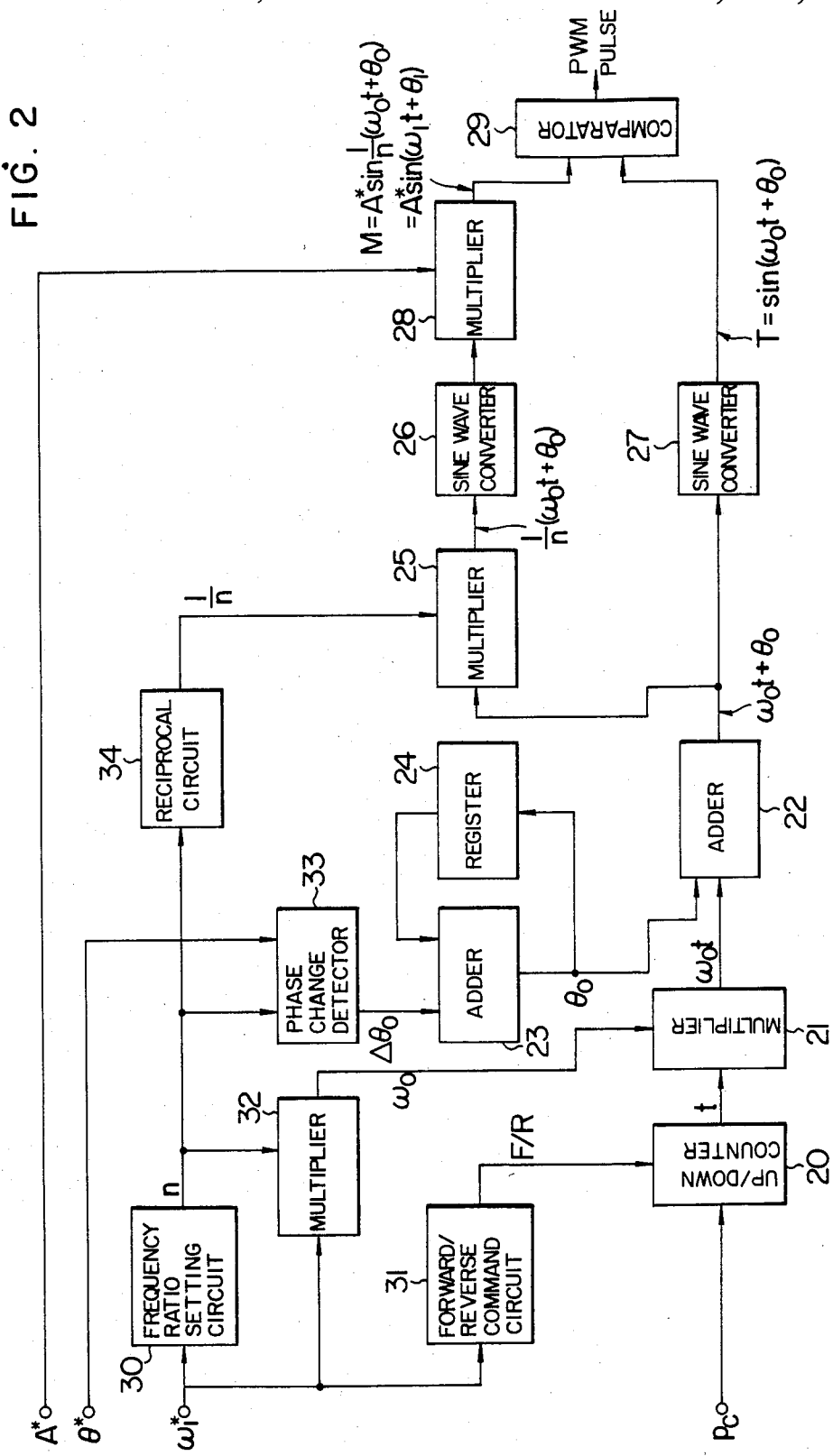
FIG. 2 shows a detail of a pulse generator.
Figure 3:
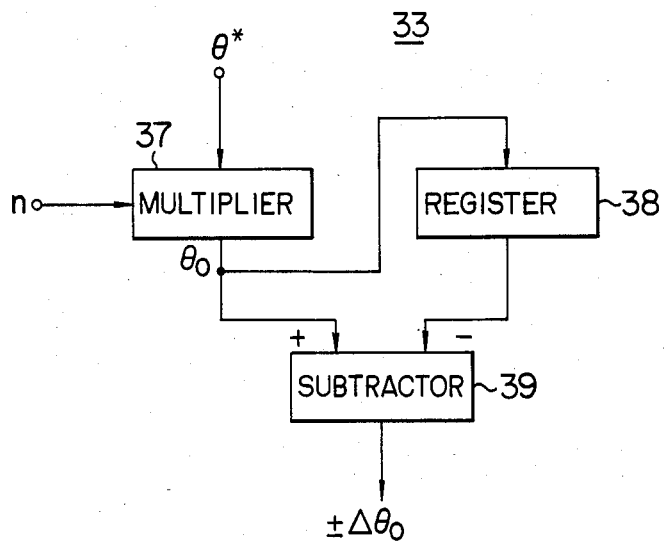
FIG. 3 shows a configuration of a phase change detection circuit.

FIG. 2 shows an embodiment of the pulse generator 15. In FIG. 2, a frequency ratio setting circuit 30 receives the primary angular frequency command $\omega_1^*$ and produces a frequency ratio signal n having a characteristic shown in FIG. 4. The frequency ratio n is determined by a maximum switching frequency permitted by a switching frequency of the PWM inverter 2. A forward/reverse command circuit 31 produces a forward signal F when the primary angular frequency command $\omega_1^*$ is positive and produces a reverse signal R when $\omega_1^*$ is negative, and supplies it to an up/down counter 20. The counter 20 receives the clock pulse Pc from the oscillator 16 and counts it up when the forward signal F is applied thereto, and counts it down when the reverse signal R is applied thereto. A multiplier 32 multiplies the primary angular frequency command $\omega_1^*$ with the frequency ratio n to obtain an angular frequency $\omega_0$ of the carrier and supplies it to a multiplier 21. The multiplier 21 multiplies a count t of the counter 20 with the carrier angular frequency $\omega_0$. A carrier phase change detector 33 receives the phase command $\theta^*$ and the frequency ratio n to obtain a phase change $\Delta\theta_0$ of the carrier. The phase change detector 33 is constructed as shown in FIG. 3. The phase command signal $\theta^*$ of the modulating wave from the voltage calculator 14 is multiplied with the frequency ratio n by a multiplier 37 to obtain a phase $\theta_0$ of the carrier corresponding to the phase command $\theta^*$ of the modulating wave. The carrier phase $\theta_0$ calculated by the multiplier 37 is stored in a register 38, and a difference between the phase $\theta_0$ calculated by the multiplier 37 and the content of the register 38 is calculated by a subtractor 39 with polarities shown in FIG. 3. As the carrier phase $\theta_0$ changes by the change of the phase command $\theta^*$ of the modulating wave, the subtractor 39 produces the phase change $\pm\Delta\theta_0$ of the carrier. When the phase change $\Delta\theta_0$ of the carrier is positive, the phase advances relative to the phase prior to the change.

Turning back to FIG. 2, an adder 23 sums the carrier phase change $\Delta\theta_0$ and the carrier phase before the change stored in the register 24 and supplies the sum to an adder 22 as the carrier phase signal $\theta_0$. The sum $(\omega_0 t + \theta_0)$ of the adder 22 is supplied to a sine wave converter 27, in which it is converted to a sine wave carrier signal $\sin(\omega_0 t + \theta_0)$. The sine wave carrier signal from the sine wave converter 27 is supplied to a comparator 29. On the other hand, a multiplier 25 receives a reciprocal 1/n of the frequency ratio n from a reciprocal circuit 34 and multiplies it with the sum $(\omega_0 t + \theta_0)$ of the adder 22. The output signal $1/n (\omega_0 t + \theta_0)$ from the multiplier 25 is supplied to a sine wave converter 26 in which it is converted to a sine wave signal $\sin 1/n(\omega_0 t + \theta_0) = \sin(\omega_1 t + \theta_1)$. A multiplier 28 multiplies the sine wave signal from the sine wave converter 26 with the amplitude command signal A* to produce a sine wave modulating signal $A^* \sin(\omega_1 t + \theta_1)$ and supplies it to the comparator 29. The comparator 29 compares the sine wave modulating signal with the sine wave carrier signal and produces a PWM pulse which has a "1" level when the modulating signal is no smaller than the carrier signal.

The operation is explained below.

The operations of the angular frequency calculator 9 and the voltage calculator 14 to calculate the primary angular frequency command signal $\omega_1^*$ or the amplitude command signal A* and the phase command signal $\theta^*$ in accordance with the following equations have been well known and the explanation thereof is omitted.

$$\omega_1^* = k(\omega_s^* + \omega_r) \tag{1}$$

Where k is a proportion constant $$A^* = \sqrt{(V_t^*)^2 + (V_m^*)^2} \tag{2}$$

$$\theta^* = \tan^{-1} \frac{V_t^*}{V_m^*} \tag{3}$$

When the induction motor 3 rotates forwardly, the output of the speed detector 4 and the command $\omega_s^*$ of the slip frequency calculator 7 are positive and hence the primary angular frequency command signal $\omega_1^*$ is positive. When the induction motor 3 rotates reversely, the speed command signal N* is negative and hence the signal $\omega_1^*$ is negative.

The pulse generator 15 receives the signals $\omega_1^*$, A* and $\theta^*$ and the clock pulse Pc from the oscillator 16 and operates in the following manner.

The up/down counter 20 counts the clock pulse Pc. When the forward signal F is applied thereto, it counts up the clock pulse Pc from zero count toward a maximum count and when the count reaches the maximum count the counter overflows and is reset to zero and repeats the count-up. When the reverse signal F is applied thereto, the counter counts down the clock pulse Pc from the maximum count toward zero and when the count reaches zero the counter is set to the maximum count and repeats the count-down. Assuming that the phase command signal $\theta^*$ is steady at a predetermined phase $\theta_1$, the phase change $\Delta\theta_0$ of the phase change detector 33 is zero and a carrier phase signal $\theta_{01}$ corresponding to the modulating wave phase $\theta_1$ is supplied to the adder 22. In this case, a sine wave carrier signal T from the sine wave converter 27 and a sine wave modulating signal T from the multiplier 28 are expressed as follows.

$$T = \sin(\omega_0 t + \theta_{01}) \tag{4}$$

$$M = A\sin\frac{1}{n}(\omega_0 t + \theta_{01}) \tag{5}$$

$$= A\sin(\omega_1 t + \theta_1)$$

Figure 5:
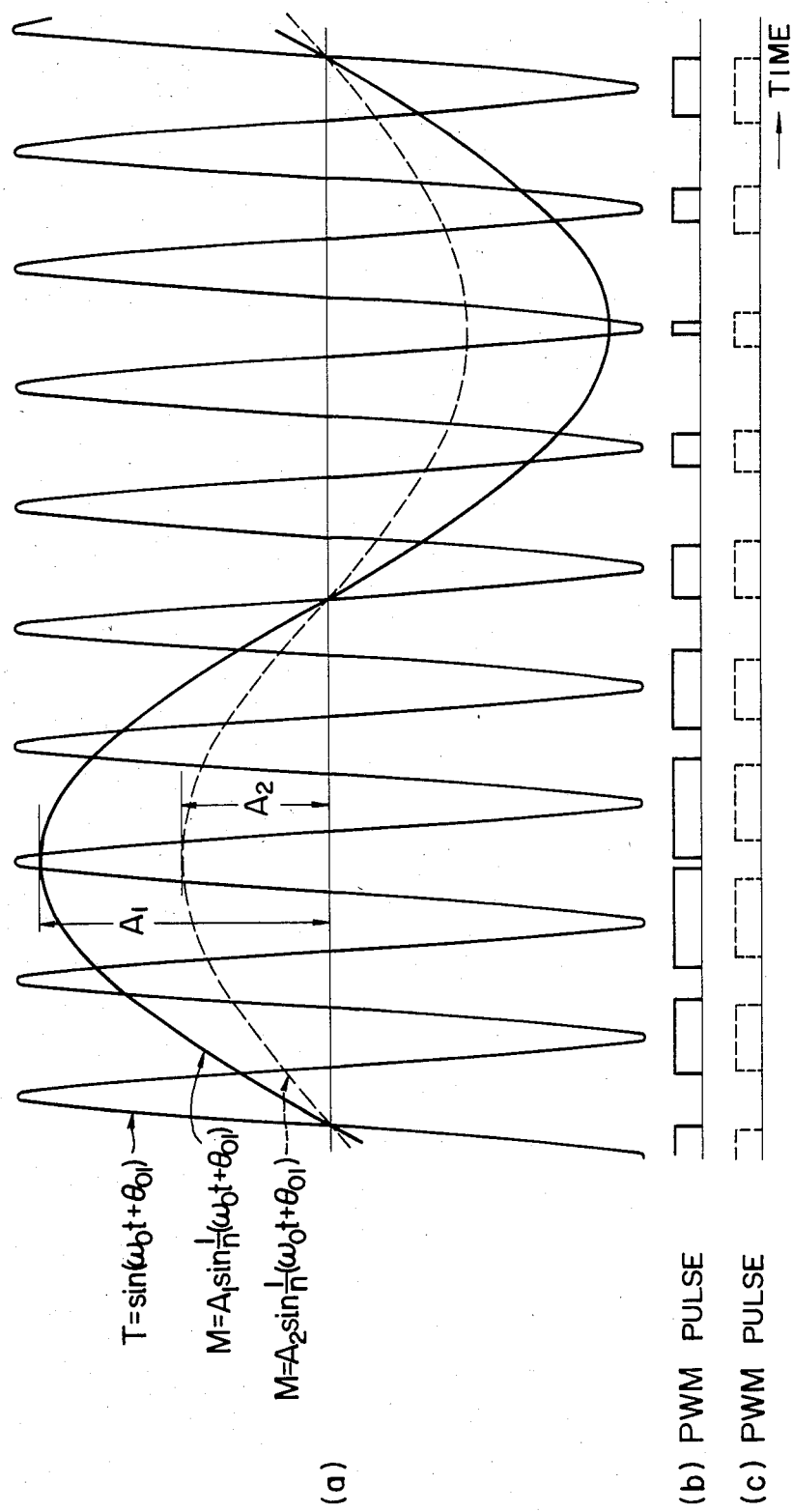
FIGS. 5 to 7 show waveforms for explaining the operation of the present invention.

When the carrier T and the modulating wave M meet the relations of the equations (4) and (5) and the modulating wave M has an amplitude $A_1$ shown by a solid line in FIG. 5a, the comparator 29 produces a PWM pulse having a waveform shown in FIG. 5b. When the modulating wave M has an amplitude $A_2$ shown by a broken line in FIG. 5a, the comparator 29 produces a PWM pulse having a waveform shown in FIG. 5c.

Figure 6:
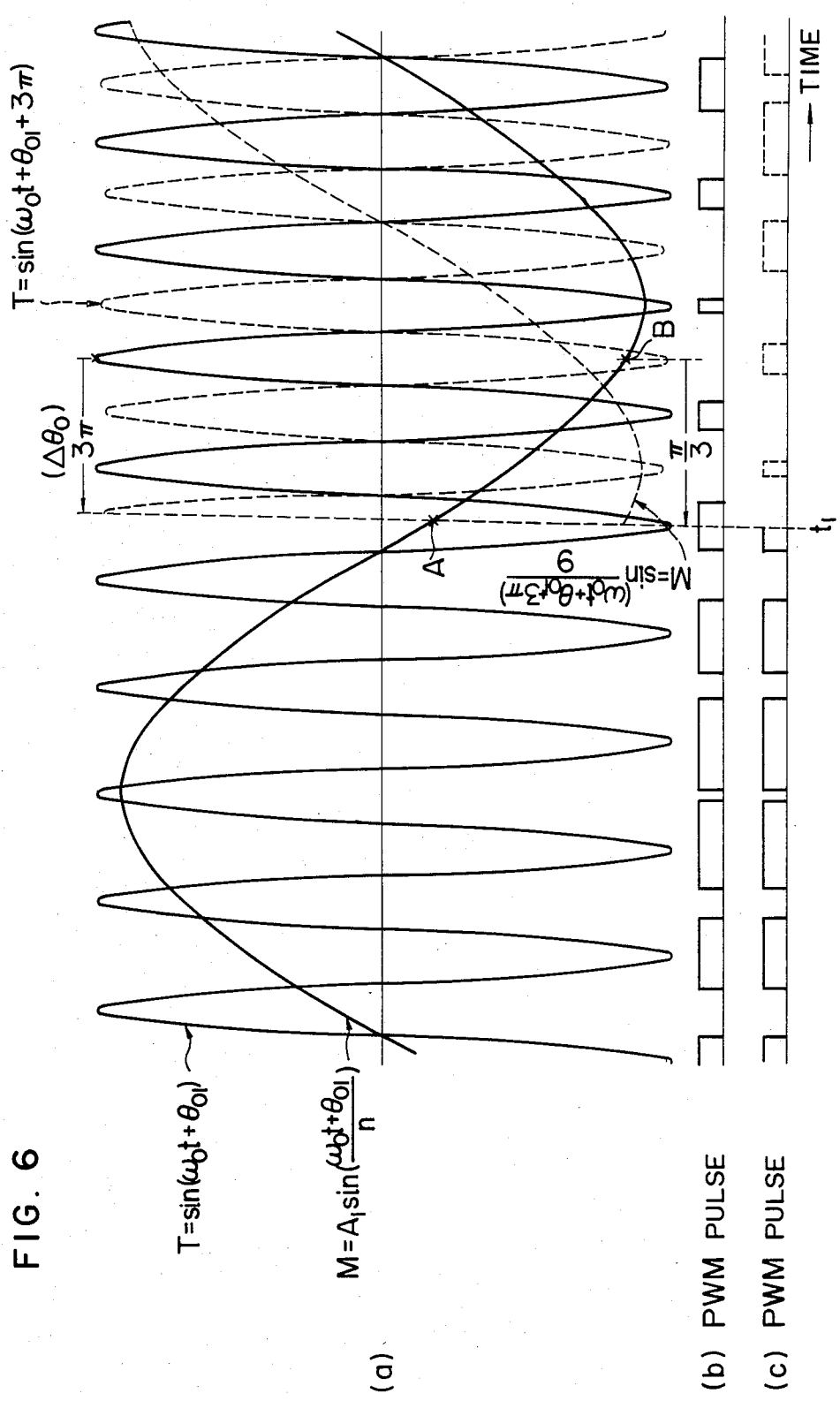

Let us assume that the carrier T and the modulating wave M meet the relations of the equations (4) and (5) to produce the PWM pulse and the phase command signal $\theta^*$ of the modulating wave (point A) advances by $\pi/3$ at a time $t_1$ shown in FIG. 6a. If the frequency ratio n set by the frequency ratio setting circuit 30 is 9, the carrier phase change $\Delta\theta_0$ from the phase change detector 33 is $3\pi$. Accordingly, the sum from the adder 22 is $\omega_0 t + \theta_{01} + 3\pi$. Assuming that the amplitude command signal A* is $A_1$, the carrier T from the sine wave converter 27 and the modulating wave M from the multiplier 28 are expressed as follows.

$$T = \sin(\omega_0 t + \theta_{01} + 3\pi) \tag{6}$$

$$M = A_1 \sin\frac{1}{9}(\omega_0 t + \theta_{01} + 3\pi) \tag{7}$$

$$= A_1 \sin\left(\frac{\omega_0 t + \theta_{01}}{9} + \frac{\pi}{3}\right)$$

When the carrier T and the modulating wave M meet the equations (6) and (7), the PWM pulse is generated with the relation between the modulating wave M and the carrier T after a point B from a time $t_1$. FIG. 6b shows a waveform of the PWM pulse when the phase of the modulating wave M does not change, and FIG. 6c shows a waveform of the PWM pulse produced by the present invention when the phase of the modulating wave M changes. As is apparent from the comparison of FIGS. 6b and 6c, the waveform after the time $t_1$ in FIG. 6c is similar to the waveform after the point B in FIG. 6b.

Figure 7:
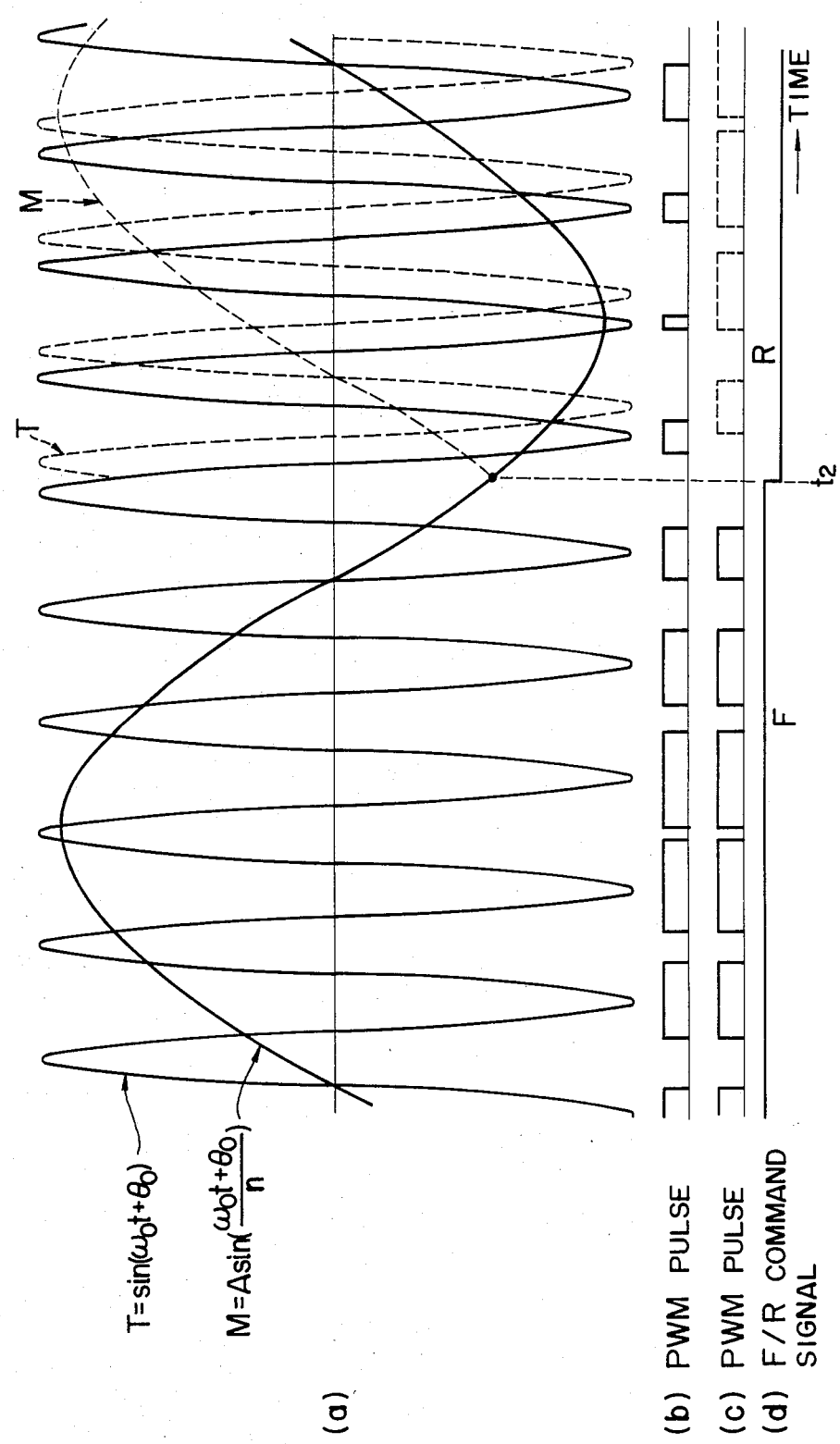

FIG. 7 shows waveforms when the forward/reverse command circuit 31 produces the reverse signal R.

Let us assume that the carrier T and the modulating wave M meet relationship of the following equation to generate the PWM pulse and the forward/reverse command circuit 31 produces the reverse signal R at a time $t_2$ as shown in FIG. 7d.

$$T = \sin(\omega_0 t + \theta_0) \tag{8}$$

$$M = A\sin\frac{1}{n}(\omega_0 t + \theta_0) \tag{9}$$

$$= A\sin(\omega_1 t + \theta_1)$$

When the reverse signal R is applied to the up/down counter 20, it counts down the clock pulse Pc. As a result, the carrier signal T and the modulating wave M change with the opposite phase time as shown by a broken line in FIG. 7a from the time $t_2$. This means that they follow the change of the magnetic flux axis of the motor 3 so that smooth forward/reverse switching is attained. When the switching occurs from the forward state to the reverse state, the PWM pulse has the waveform shown in FIG. 7c. The waveform of the PWM pulse when the reverse command R is not applied at the time $t_2$ and the forward state remains as shown in FIG. 7d.

In this manner, the PWM pulse for controlling the firing of the PWM inverter is generated, and the sine wave signal is used as the carrier and the phase of the carrier is changed to follow the phase of the modulating wave. Thus, even if the phase of the modulating wave suddenly changes, the PWM pulse which causes the output voltage (fundamental component) of the PWM inverter to be sinusoidal can be generated. Accordingly, the precise vector control can be attained.

The present invention may also be implemented by software processing by using a microprocessor.

Figure 8:
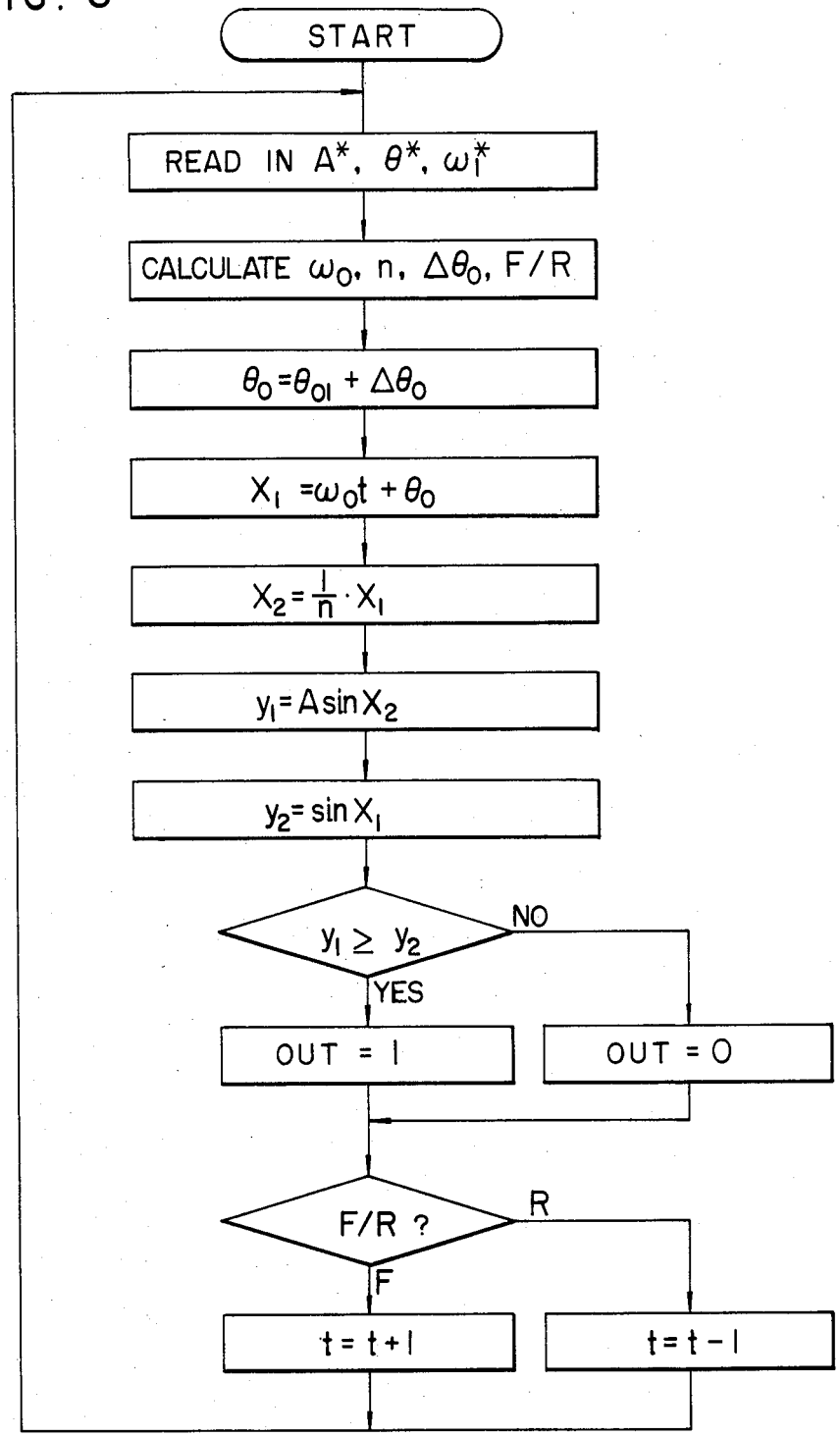
FIG. 8 shows a flow chart when the present invention is embodied by a microprocessor.

FIG. 8 shows a flow chart for such software processing.

The signals $A^*$, $\theta^*$ and $\omega_1^*$ are read in and $\omega_0$, n, $\Delta\theta_0$ and F/R are calculated. Then, the previous $\theta_{01}$ is added to $\Delta\theta_0$ to obtain the phase $\theta_0$, and $\omega_0$ and t are multiplied to obtain the product $\omega_0 t$, to which $\theta$ is added to obtain $x_1$. Then, $x_1$ and 1/n are multiplied to obtain $x_2$. From $x_1$ and $x_2$, $y_1 = A \sin x_2$ and $y_2 = \sin x_1$ are calculated and they are compared. If $y_1 \geq y_2$, a "1" output is produced, and if $y_1 < y_2$, a "0" output is produced. When the forward command F is produced, t is set to $t+1$, and when the reverse command is produced, t is set to $t-1$. In this manner, the same function as that of the embodiment of FIG. 1 is attained. In the present invention, since the carrier signal is also represented by a continuous equation, it is adapted to a full-digital circuit using a microprocessor.

As described hereinabove, according to the present invention, the sine wave signal is used as the carrier and the phase of the carrier is changed to follow the abrupt phase change of the modulating wave so that the PWM pulse which causes the output voltage of the PWM inverter to be sinusoidal is generated even if the phase of the modulating wave is suddenly changed. As a result, the precise vector control is attained. Since the carrier signal and the modulating wave signals are continuous since wave functions, the digital control is readily attained by using the microprocessor.

What is claimed is:

1. A pulse width modulation pulse generator comprising:
    modulating wave generating means for generating a sine wave modulating signal which forms a fundamental component of an output voltage of a pulse width modulation inverter;
    carrier generating means for generating a sine wave carrier signal which is at a frequency n times as high as a frequency of said sine wave modulating signal and synchronized with said sine wave modulating signal; and
    comparison means connected to said modulating wave generating means and said carrier generating means for comparing said sine wave modulating signal with said sine wave carrier signal to generate a pulse width modulation pulse.

2. A pulse width modulation pulse generator according to claim 1, wherein said carrier generating means changes a phase of said sine wave carrier signal in synchronism with a change of a phase of said sine wave modulating signal, the change of the phase of said carrier signal being n times as large as that of said modulating signal.

3. A pulse width modulation pulse generator according to claim 1, wherein said carrier generating means changes a frequency of said carrier signal in inverse proportion to a frequency of said modulating signal.

4. A pulse width modulation pulse generator according to claim 1, wherein an amplitude of said sine wave carrier signal is larger than that of said sine wave modulating signal.

* * * * *